United States Patent

Hall et al.

Patent Number: 5,782,934
Date of Patent: Jul. 21, 1998

[54] PROCESS OF DYEING WITH DISAZO DYES CONTAINING A FLUOROSULPHONYL GROUP AND USE THEREOF

[75] Inventors: Nigel Hall, Bury; Mark Robert James, Rawtenstall, both of United Kingdom

[73] Assignee: Zeneca Limited, London, England

[21] Appl. No.: 687,611

[22] PCT Filed: Jan. 24, 1995

[86] PCT No.: PCT/GB95/00127

§ 371 Date: Aug. 8, 1996

§ 102(e) Date: Aug. 8, 1996

[87] PCT Pub. No.: WO95/22649

PCT Pub. Date: Aug. 24, 1995

[30] Foreign Application Priority Data

Feb. 18, 1994 [GB] United Kingdom ............. 9403133

[51] Int. Cl.⁶ ............. D06P 3/26; D06P 3/54; D06P 3/72; C09B 31/02
[52] U.S. Cl. ............. 8/506; 8/529; 8/662; 534/816; 534/829; 534/831
[58] Field of Search ............. 8/506, 662, 922, 8/529; 934/816, 829, 831

[56] References Cited

U.S. PATENT DOCUMENTS 2,427,995 9/1947 Parker et al.
2,576,037 11/1951 Parker et al.
3,131,021 4/1964 Baird et al.
5,194,463 3/1993 Krutak et al. ............. 524/35

FOREIGN PATENT DOCUMENTS 1 307 200  2/1963  France.
54-050681  4/1979  Japan.

*Primary Examiner*—Margaret Einsmann
*Attorney, Agent, or Firm*—Pillsbury Madison & Sutro LLP

[57] ABSTRACT

A process for colouring a synthetic textile material or fiber blend thereof which comprises applying to the synthetic textile material a compound of Formula (1):

$$A-N=N-D-N=N-E \qquad \text{Formula (1)}$$

wherein:

A, D and E each independently is an optionally substituted heterocyclic or carbocyclic group and at least one of A, D or E carries directly at least one —$SO_2F$ group or carries a substituent to which at least one —$SO_2F$ group is attached.

A process for the mass coloration of plastics which comprises incorporating into a plastics material a compound or mixture thereof which is free from water solubilising groups, of Formula (1).

7 Claims, No Drawings

PROCESS OF DYEING WITH DISAZO DYES CONTAINING A FLUOROSULPHONYL GROUP AND USE THEREOF

This application claims benefit of International application PCT/GB95/00127, filed Jan. 24, 1995.

The present invention relates to a process for colouring synthetic textile materials, to synthetic textile materials when coloured, to a process for the mass coloration of plastics, to plastics when coloured, to certain novel azo dyes and to compositions containing azo dyes.

According to the present invention there is provided a process for colouring a synthetic textile material or fibre blend thereof which comprises applying to the synthetic textile material a compound of Formula (1):

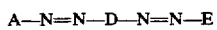  Formula (1)

wherein:

A, D and E each independently is an optionally substituted heterocyclic or carbocyclic group and at least one of A, D or E carries directly at least one —SO$_2$F group or carries a substituent to which at least one —SO$_2$F group is attached.

The presence of one or more —SO$_2$F groups in a dye molecule generally improves the properties of that dye and confers surprisingly good wet-fastness and light-fastness properties.

Different compounds of Formula (1) may be mixed or the compounds of Formula (1) may be mixed with dyes which do not contain an —SO$_2$F group, such mixtures are a feature of the present invention. The mixtures may be simple physical mixtures or may be mixed crystals formed for example by co-crystallisation. Such mixtures generally show improvement in dyeing properties. Crystalline modifications of compounds of Formula (1) exist and it is intended that the present definition includes such crystalline modifications which may be formed by heat treatment.

The synthetic textile material may be selected from secondary cellulose acetate, cellulose triacetate, polyamide, polyacrylonitrile and aromatic polyester. The synthetic textile material is preferably polyamide or aromatic polyester, such as polyhexamethylene adipamide or polyethylene terephthalate more preferably aromatic polyester and especially polyethlene terephthalate. Fibre blends may comprise mixtures of different synthetic textile materials or mixtures of synthetic and natural textile materials. Preferred fibre blends are those of polyester cellulose such as polyester-cotton. The textile materials or blends thereof may be in the form of filaments, loose fibres, yarn, woven or knitted fibres.

The dyes of Formula (1) preferably have low solubility in water, typically less than 1% preferably less than 0.5% and especially less than 0.2% solubility in water. The dyes of Formula (1) are thus free from water solubilising groups such as —SO$_3$H, —CO$_2$H, —PO$_3$H and quaternary amino.

The dyes of Formula (1), optionally in conjunction with other disperse dyes may be applied to the synthetic textile materials or fibre blends thereof by methods which are conventionally employed in dyeing disperse dyes to such materials and fibre blends. For example, the dyes of Formula (1) in the form of an aqueous dispersion may be applied by dyeing, padding or printing processes using the conditions and additives conventionally used in carrying out such processes. The process conditions may be selected from the following:

i) exhaust dyeing at a pH of from 4 to 6.5, at a temperature of from 125° C. to 140° C. for from 10 to 120 minutes and under a pressure of from 1 to 2 bar, a sequestrant may be optionally be added;

ii) continuous dyeing at a pH of from 4 to 6.5, at a temperature of from 190° C. to 225° C. for from 15 seconds to 5 minutes, a migration inhibitor may optionally be added;

iii) printing direct at a pH of from 4 to 6.5, at a temperature of from 160° C. to 185° C. for 4 to 15 minutes for high temperature steaming, or at a temperature of from 190° C. to 225° C. for 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye may be optionally be added;

iv) discharge printing (by padding the dye onto the textile material, drying and overprinting) at a pH of from 4 to 6.5, migration inhibitors and thickeners may optionally be added;

v) carrier dyeing at a pH of from 4 to 6.5, at a temperature of from 95° C. to 100° C. using a carrier such as methylnaphthalene, diphenylamine or 2-phenylphenol, sequesterants may optionally be added; and vi) atmospheric dyeing of acetate, triacetate add nylon at a pH of from 4 to 6.5, at a temperature of 85° C. for acetate or at a temperature of 90° C. for triacetate and nylon for from 15 to 90 minutes, sequesterants may optionally be added.

In all the above processes the compound of Formula (1) is applied as a dispersion comprising from 0.001% to 4% of the compound in aqueous medium.

The present compounds generally provide coloured textile material which shows good fastness to washing, light and heat.

The heterocyclic group represented by A, D or E may be selected from thienyl, thiazolyl, isothiazolyl, pyrazolyl, imidazolyl, pyridyl, pyridonyl, 1,2,4- and 1,3,4-thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, 1,2,3- and 1,2, 4-triazolyl. The carbocyclic group represented by A, D or E may be phenyl or naphthyl.

A and E each independently is preferably thienyl, phenyl, naphthyl, thiazolyl, isothiazolyl, pyridonyl, more preferably thien-2-yl, phenyl, naphthyl, thiazol-2-yl, isothiazol-5-yl or pyrid-4-one-5-yl and especially phenyl or naphthyl.

D is preferably phenyl, naphthyl, biphenyl, thienyl or thiazolyl, more preferably phen-1,4-ylene, naphth-1,4-ylene, 4,4'-biphenylene, 3,3'-dichloro-4,4'-biphenylene, thien-2,5-ylene or thiazol-2,5-ylene and especially phen-1, 4-ylene, naphth-1,4-ylene or thien-2,5-ylene.

Examples of suitable substituents for A, D and E are cyano, hydroxy, nitro, halo such as fluoro, chloro and bromo, fluorosulphonyl, trifluoromethyl, alkyl, alkoxy, aryloxy, —COalkyl, —NHCOalkyl, —NHSO$_2$alkyl, —OCOalkyl, —COOalkyl, —Salkyl, —Saryl, —SO$_2$alkyl, —SO$_2$aryl, NR$^1$R$^2$, —CONR$^1$R$^2$, —SO$_2$NR$^1$R$^2$ in which R$^1$ and R$^2$ each independently is —H or cycloalkyl, alkyl, alkyl or alkoxy substituted by —OH, —CN, halo such as —F, —Cl and —Br, phenyl, —SO$_2$F, —OCOalkyl, —COOalkyl,

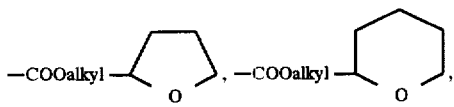

—OCOphenyl, —COCphenyl, —OCO (fluorosulphonylphenyl), alkyl(fluorosulphonylphenyl), —OCO(fluorosulphonylphenyl), —COOalkoxyalkoxy, alkoxyalkoxy, —OCalkyl, —OCalkoxyalkoxy, alkenyl, —OCalkenyl, —COOalkylOalkyl, —OalkylCN, alkoxy, aryloxy, —OalkyOCOalkylOalkyl in which each alkyl is $C_{1-10}$-alkyl and each alkoxy is $C_{1-10}$alkoxy each of which may be straight or branched chain and each alkyl, alkoxy, aryl or phenyl group may carry an —$SO_2F$ substituent or $R^1$ and $R^2$ together with the —N atom to which they are attached form a 5- or 6-membered ring such as morpholino or piperidino.

Preferred substituents for A, D and E are cyano, nitro, chloro, bromo, fluorosulphonyl, $C_{1-6}$-alkyl, $C_{1-6}$-alkoxy, —$COC_{1-6}$-alkyl, —$NHCOC_{1-6}$-alkyl, -$OCOC_{1-6}$-alkyl, —$COOC_{1-6}$-alkyl, —$NR^1R^2$ in which $R^1$ and $R^2$ each independently is —H, $C_{1-6}$-alkyl, $C_{1-6}$-alkyl substituted by —OH, —CN, —Cl, phenyl, -$OCOC_{1-6}$-alkyl, -$COOC_{1-6}$-alkyl.

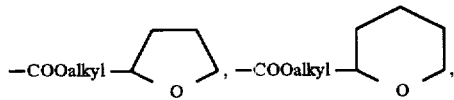

$C_{1-4}$-alkyl(4-fluorosulphonylphenyl), OCO(3-fluorosulphonylphenyl), —OCCphenyl, —OCO(4-fluorosulphonylphenyl), -$C_{2-4}$-alkenyl, —$COOC_{1-6}$-alkylO$C_{1-6}$-alkyl, -$OC_{1-6}$-alkylCN, -$OC_{1-6}$-alkylOCO$C_{1-6}$-alkylO$C_{1-6}$-alkyl or where $R^1$ and $R^2$ together with the —N atom to which they are attached form a morpholino or piperidino.

The compounds of Formula (1) preferably carry a total of from one to three —$SO_2F$ groups, more preferably from one to two —$SO_2F$ groups and especially one —$SO_2F$ group.

A preferred sub-group of compounds of Formula (1) are those of Formula (2):

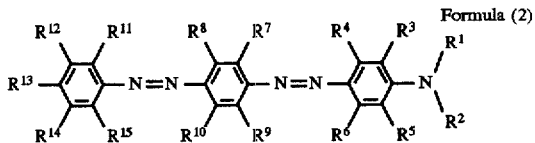

in which:

$R^1$ and $R^2$ each independently is —H, $C_{1-6}$-alkyl or $C_{1-6}$-alkyl substituted by —OH, —CN, —F, —Cl, —Br, —$SO_2F$, phenyl, phenylSO$_2$F, -$OCOC_{1-6}$-alkyl, -$COOC_{1-6}$-alkyl, -$COOC_{1-6}$-alkoxy$C_{1-6}$-alkoxy, $C_{1-6}$-alkoxy, $C_{1-6}$-alkoxy$C_{1-6}$-alkoxy, -$OCC_{1-6}$-alkyl, -$OCC_{1-6}$-alkoxy$C_{1-6}$-alkoxy, —OCO(3-fluorosulphonylphenyl), —OCO(4-fluorosulphonylphenyl), -OCCphenyl or -$OCOC_{2-4}$-alkenyl;

$R^3$ is —H, —$SO_2F$, $C_{1-6}$-alkyl or $C_{1-6}$-alkoxy;

$R^4$ is —H, —$SO_2F$, $C_{1-6}$-alkyl, $C_{1-6}$-alkoxy or -$NHCOC_{1-6}$-alkyl;

$R^5$, $R^6$, $R^7$, $R^8$, $R^9$ and $R^{10}$ each independently is —H, $C_{1-6}$-alkyl, $C_{1-6}$-alkoxy or —$SO_2F$;

$R^{11}$, $R^{12}$, $R^{13}$, $R^{14}$ and $R^{15}$ each independently is —H, —CN, —$NO_2$, —$SO_2F$, $C_{1-6}$-alkyl, $C_{1-6}$-alkoxy, -$COC_{1-6}$-alkyl, -$COOC_{1-6}$-alkyl, —F, —Cl, —Br, —$CF_3$, —$NR^1R^2$, —$CONR^1R^2$, —$SO_2NR^1R^2$ in which $R^1$ and $R^2$ are as hereinbefore defined.

In compounds of Formula (2) $R^7$, $R^8$, $R^9$ and $R^{10}$ each independently is preferably —H, $C_{1-6}$-alkyl or $C_{1-6}$-alkoxy.

A further preferred sub-group of compounds of Formula (1) are those of Formula (3):

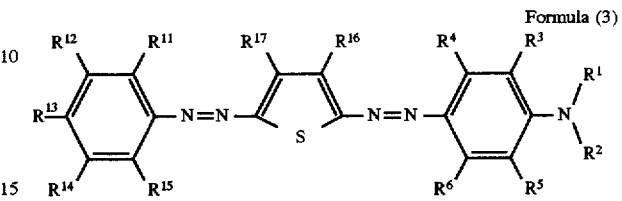

in which:

$R^1$, $R^2$ $R^3$,
$R^4$, $R^5$, $R^6$, $R^{11}$, $R^{12}$, $R^{13}$, $R^{14}$ and $R^{15}$ are as hereinbefore defined for compounds of Formula (2); and $R^{16}$ is —H, —CN, —$SO_2F$, —$COOC_{1-6}$-alkyl, —$COC_{1-6}$-alkyl or —$CONR^1R^2$ in which $R^1$ and $R^2$ are as hereinbefore defined; and $R^{17}$ is —H, —CN, —$SO_2F$ or $C_{1-6}$-alkyl.

In compounds of Formula (3) $R^{16}$ is preferably —H, —CN, —$COOC_{1-6}$-alkyl, —$COC_{1-6}$-alkyl or —$CON^1R^2$ and $R^{17}$ is preferably —H, —CN or $C_{1-6}$-alkyl.

A further preferred subgroup of compounds of Formula (1) are those of Formula (4)

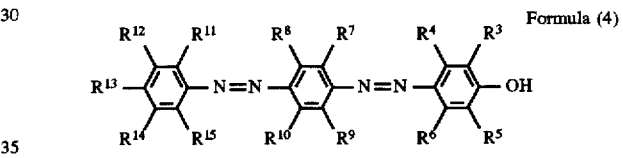

in which $R^3$ to $R^{15}$ are as hereinbefore defined.

In a further preferred embodiment of the present invention the compounds of Formulae (1),(2),(3) and (4) carry directly at least one —$SO_2F$ group or carry a substituent to which at least one —$SO_2F$ group is attached and carry at least one ester group or carry a substituent to which at least one ester group is attached. Such dyes with both —$SO_2F$ and ester groups show improved dyeing properties, particularly wet-fastness and light-fastness.

Compositions comprising dispersions of the compounds of Formulae (1), (2), (3) or (4) in which A, D and E are as hereinbefore defined in aqueous media are novel and form a further feature of the present invention. The compositions typically comprise from 1% to 30% of a compound of Formulae (1), (2) or (3) and are preferably buffered at a pH from 2 to 7, more preferably at a pH from 4 to 6.

These dispersions may further comprise ingredients conventionally used in dyeing applications such as dispersing agents for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphonated or phosphated, inorganic salts, de-foamers such as mineral oil or nonanol, organic liquids and buffers. Dispersing agents may be present at from 10% to 200% on the weight of the compound of Formula (1). Wetting agents may be used at from 0% to 20% on the weight of the compound of Formula (1). The dispersions may be prepared by bead milling the compound of Formula (1) with glass beads or sand in an aqueous medium.

According to a further feature of the present invention there is provided a process for the mass coloration of plastics which comprises incorporating into a plastics material a compound or mixture thereof which is free from water solubilising groups, of Formula (1) in which A, D and E each independently is an optionally substituted heterocyclic or carbocyclic group and at least one of A, D or E carries directly at least one —SO$_2$F group or carries a substituent to which at least one —SO$_2$F group is attached.

The plastics may be selected from polystyrene, acrylics, styrene/acrylonitrile mixtures, acrylonitrile/butadiene/styrene mixtures, polycarbonate, polyether-sulphone, nylons, rigid PVC (uPVC) and polypropylene.

The compound may be incorporated by blending with granules or powdered plastics material by, for example, dry tumbling or high-speed mixing followed by injection moulding on a screw machine or by conventional compounding/masterbatching techniques. The present dyes generally dissolve or disperse readily in hot plastics melt and provide bright coloration generally with good clarity and good light fastness.

The plastics materials when coloured with the above dyes form a further feature of the present invention.

A number of compounds of Formula (1) used in the above coloration process are novel except for 1-(4-hydroxyphenylazo)-2-methoxy-4-(4-fluorosulphonylphenylazo)benzene; 1-(2-chloro-4-nitrophenylazo)-5-methyl-2-fluorosulphonyl-4-(2-hydroxy-3-(carbonyl (N-phenyl) amino) naphth-1-ylazo) benzene; 1-(2-methyl-5-fluorosulphonylphenylazo)-3-ethoxy-4-(2-hydroxy-3-(carbonyl (N-phenyl) amino) naphth-1-ylazo) benzene; 1-(3-fluorosulphonylphenylazo)-2,5-dimethoxy-4-(2-hydroxy-3-(carbonyl(N-naphth-1-yl)amino)naphth-1-ylazo)benzene; and 1-(2-methyl-5-fluorosulphonylphenylazo)-4-(2-hydroxy-3-(carbonyl(N-phenyl)amino)naphth-1-ylazo)naphthalene and these form a further feature of the present invention.

The compounds of Formula (1) may be prepared by usual methods for the preparation of disazo compounds such as by diazotisation of an amine A—NH$_2$ and coupling onto a component X—D—NH$_2$ in which E and X are as hereinbefore defined and X is a group displaceable by a diazotised amine, followed by diazotisation of the resultant monoazo compound A—N=N—D—NH$_2$ and coupling onto a component E—X in which E and X are as hereinbefore defined.

Typically the amine A—NH$_2$ may be diazotised in an acidic medium such as acetic or propionic acid or mixtures thereof using a nitrosating agent such as nitrosyl sulphuric acid at a temperature from −5° C. to 5° C. The diazotised amine may be coupled onto the component X—D—NH$_2$ in an alkanol such as methanol and water at a temperature of from 0° C. to 5° C. The monoazo compound A—N=N—D—NH$_2$ may be recovered from the reaction mixture by filtration. The A—N=N—D—N may be diazotised in an acidic medium such as acetic or sulphuric acid or mixtures thereof using a nitrosating agent as described above and coupled onto a component E—X in aqueous medium preferably whilst maintaining the pH at about 3. The A—N=N—D—N=N—E product may be recovered from the reaction mixture by filtration and may be purified by sluing in an alkanol such as methanol and refiltering.

Fluorosulphonyl groups may be introduced into the compounds of Formula (1) or into the A, D and E components prior to coupling by methods generally available in the literature. For example reaction of the compound of Formula (1), A—NH$_2$, the NH$_2$ being protected as necessary, D—X in which A and D are as hereinbefore defined, with chlorosulphonic acid optionally in the presence of dimethylformamide and thionylchloride at a temperature of from 30° C. to 100° C. gives the chlorosulphonyl derivative. The chlorosulphonyl derivative may be reacted in boiling aqueous media with potassium fluoride to give the fluorosulphonyl derivative.

Alternatively the compound of Formula (1), A—NH$_2$, or D—X may be sulphonated with sulphuric acid or oleum to give the sulphonic acid derivative which may be converted to the chlorosulphonyl derivative by reaction, either of the free acid or an inorganic salt thereof, with thionylchloride optionally in the presence of a chlorophosphorus compound such as phosphorus oxychloride or phosphorus pentachloride in an organic liquid such as an aromatic hydrocarbon at a temperature of from 20° C. to 110° C. The chlorosulphonyl derivative may then be converted to the fluorosulphonyl derivative as described above.

The compound of Formula (1) is useful for the coloration of synthetic textile materials particularly polyester textile materials and fibre blends thereof to which they impart colours which are excellent wet and light fastness properties.

The invention is further illustrated by the following Examples.

EXAMPLE 1

4-Aminobenzenesulphonyl fluoride (4 parts) was stirred in acetic/propionic acid 86/14 vol/vol (250 parts) at 0°–5° C. While maintaining the temperature below 10° C., 40% nitrosyl sulphuric acid (4.8 parts) was added carefully and stirred for 1.5 hours before adding slowly to 2-amino-3-cyanothiophene (4.2 parts) in methanol (625 parts) and ice/water (840 parts). The pH was maintained at 3 by the addition of sodium acetate and 50% sodium hydroxide solution. After stirring at 0°–5° C. for a further 2 hours filtration yielded 3.3 parts of 2-amino-3-cyano-5-(4'-sulphonylfluorophenylazo)thiophene.

2-Amino-3-cyano-5-(4'-sulphonylfluorophenylazo) thiophene (12.5 parts) was stirred in glacial acetic acid (830 parts) at 15° C. while 50% sulphuric acid (375 parts) was added slowly. On cooling further to 0°–5° C., 40% nitrosyl sulphuric acid (18 parts) was added carefully and the reaction stirred for 2 hours before adding slowly, while maintaining the pH at 3 by the addition of 50% sodium hydroxide solution, to a mixture of N,N-bis-(acetoxyethyl)-aniline (15 parts) in ice/water (960 parts), sulphamic acid (10 parts) and saturated sodium acetate solution (50 parts). The product was isolated by filtration, washed with water and pulled dry. The damp solid was then slurried in methanol (100 parts), refiltered and dried overnight to yield 4-(3-cyano-5-(4'-sulphonylfluorophenylazo)-2-thiophene-azo)-N,N-bis-acetoxyethyl)-aniline (4 parts) which when applied to polyester materials from an aqueous dispersion gave blue shades.

EXAMPLE 2

The procedure for Example 1 was repeated except that in place of 15 parts of N,N-bis-(acetoxyethyl)-aniline; 15 parts of N-(2-cyanoethyl)-N-(2-methoxy-carbonylethyl)-m-toluidine were used to yield 4-(3-cyano-5-(4'-sulphonylfluorophenylazo)-2-thiophene-azo)- N-(2-cyanoethyl)-N-(2-methoxy-carbonylethyl)-m-toluidine (3.8 parts) which when applied to polyester materials from an aqueous dispersion gave blue shades.

EXAMPLE 3

The procedure for Example 1 was repeated except that in place of 15 parts of N,N-bis-(acetoxyethyl)-aniline; 15 parts N,N-bis-(2-cyanoethyl)-aniline were used to yield the product 4-(3-cyano-5-(4'-sulphonylfluoro-phenyl azo)-2- thiophene-azo)-N,N-bis-(2-cyanoethyl)-aniline (2.2 parts) which when applied to polyester materials from an aqueous dispersion gave blue shades. $\lambda_{max}$ 575 nm.

EXAMPLE 4

The procedure for Example 1 was repeated except that in place of 15 parts of N,N-bis-(acetoxyethyl)-aniline; 15 parts of N-ethyl-N-( 2-carboxyethyl)-aniline were used to yield the product 4-(3-cyano-5-(4'-sulphonylfluorophenylazo)-2-thiophene-azo)-N-ethyl-N-(2-carboxyethyl)-aniline (2.4 parts) which when applied to polyester materials from an aqueous dispersion gave blue shades. $\lambda_{max}$ 637 nm.

EXAMPLE 5

The procedure for Example 1 was repeated except that in place of 15 parts of N,N-bis-(acetoxyethyl)-aniline; 15 parts of N,N-diethyl m-acetanilide were used to yield the product 4-(3-cyano-5-(4'-sulphonylfluorophenylazo)-2-thiophene-azo)-N,N-diethyl m-acetanilide (6.5 parts) which when applied to polyester materials from an aqueous dispersion gave blue shades.

EXAMPLE 6

3-Aminobenzenesulphonyl fluoride hydrochloride hydrate (4 parts) was stirred in acetic/propionic acid 86/14 vol/vol (250 parts) at 0°–5° C. While maintaining the temperature below 10° C., 40% nitrosyl sulphuric acid (4.8 parts) was added carefully and stirred for 1.5 hours before adding slowly to 2-amino-3-cyanothiophene (4.2 parts) in methanol (625 parts), ice/water (840 parts). The pH was maintained at 3 by the addition of sodium acetate and 50% sodium hydroxide solution. After stirring at 0°–5° C. for a further 2 hours filtration yielded 3.3 parts of 2-amino-3-cyano-5-(3'-sulphonylfluoro-phenylazo)-thiophene.

2-Amino-3-cyano-5-(3'-sulphonylfluoro-phenylazo)-thiophene (12.5 parts) was stirred in glacial acetic acid (830 parts) at 15° C. while 50% sulphuric acid (375 parts) was added slowly. On cooling further to 0°–5° C., 40% nitrosyl sulphuric acid (18 parts) was added carefully and the reaction stirred for 2 hours before adding slowly, while maintaining the pH at 3 by the addition of 50% sodium hydroxide solution, to a mixture of N,N-diethylaniline (15 parts) was stirred in ice/water (960 parts), sulphamic acid (10 parts) and saturated sodium acetate solution (50 parts). The diazo (12.5 parts) was then added slowly. The product was isolated by filtration, washed with water and pulled dry. The damp solid was then slurried in methanol (100 parts), refiltered then washed with water to yield 4-(3-cyano-5-(3'-sulphonylfluorophenylazo)-2-thiophene-azo)-N,N-diethyl aniline (1.7 parts). When applied to polyester materials from an aqueous dispersion, the dye gave blue shades.

EXAMPLE 7

The procedure for Example 6 was repeated except that in place of 15 parts of N,N-diethyl aniline; 15 parts of N-ethyl-N-(2-cyanoethyl) aniline were used to yield the product 4-(3-cyano-5-(3'-sulphonylfluorophenylazo)-2-thiophene-azo)-N-ethyl-N-(2-cyanoethyl) aniline (7 parts) which when applied to polyester materials from an aqueous dispersion gave blue shades.

EXAMPLE 8

The procedure for Example 6 was repeated except that in place of 15 parts of N,N-diethyl aniline; 15 parts of N-(2-cyanoethyl)-N-(acetoxyethyl)aniline were used to yield the product 4-(3-cyano-5-(3'-sulphonylfluorophenylazo)-2-thiophene-azo)-N-(2-cyanoethyl) -N-(acetoxyethyl) aniline (2 parts) which when applied to polyester materials from an aqueous dispersion gave blue shades. $\lambda_{max}$ 585 nm.

EXAMPLE 9

The procedure for Example 6 was repeated except that in place of 15 parts of N,N-diethyl aniline; 15 parts of N-octyl-N-(sec)butyl-aniline were used to yield the product 4-(3-cyano-5-(3'-sulphonylfluorophenylazo)-2-thiophene-azo)-N-octyl-N- (sec)butyl-aniline (1.5 parts) which when applied to polyester materials from an aqueous dispersion gave blue/green shades.

EXAMPLE 10

The procedure for Example 6 was repeated except that in place of 15 parts of N,N-diethyl aniline; 15 parts of N,N-diethyl m-acetanilide were used to yield the product 4-(3-cyano-5-(3'-sulphonylfluorophenylazo)-2-thiophene-azo)-N,N-diethyl m-acetanilide (3 parts) which when applied to polyester materials from an aqueous dispersion gave blue/green shades.

EXAMPLE 11

The procedure for Example 6 was repeated except that in place of 15 parts of N,N-diethyl aniline; 15 parts of N-butyl-N-secbutyl m-acetanilide were used to yield the product 4-(3-cyano-5-(3'-sulphonylfluorophenylazo)-2-thiophene-azo) -N-butyl-N-sec-butyl m-acetanilide (8.5 parts) which when applied to polyester materials from an aqueous dispersion gave blue/green shades.

EXAMPLE 12

The procedure for Example 6 was repeated except that in place of 15 parts of N,N-diethyl aniline; 15 parts of N-ethyl-N-benzyl-aniline were used to yield the product 4-(3-cyano-5-(3'-sulphonylfluorophenylazo)-2-thiophene-azo)-N-ethyl-N-benzyl-aniline (2.3 parts) which when applied to polyester materials from an aqueous dispersion gave blue shades.

EXAMPLE 13

The procedure for Example 6 was repeated except that in place of 15 parts of N,N-diethylaniline; 15 parts of N-ethyl-N-2-isopropenoxycarbonylethylaniline were used to yield the product 4-(3'-cyano-5-(3'-sulphonylfluorophenylazo)-2-thiophene-azo)N-ethyl-N-2-isopropenoxycarbonylethylaniline (2 parts) which when applied to polyester materials from an aqueous dispersion gave blue shades.

EXAMPLE 14

3-Amino-4-methoxybenzenesulphonylfluoride (4 parts) was stirred in acetic/propionic acid 86/14 vol/vol (250 parts) at 0°–5° C.

While maintaining the temperature below 10° C., 40% nitrosyl sulphuric acid (4.8 parts) was added carefully and stirred for 1.5 hours before adding slowly to 2-amino-3-cyanothiophene (4.2 parts) in methanol (625 parts), ice/water (840 parts). The pH was maintained at 3 by the addition of sodium acetate and 50% sodium hydroxide solution. After stirring at 0°–5° C. for a further 2 hours filtration yielded 3.2 parts of 2-amino-3-cyano-5-(2'-methoxy-5'-sulphonylfluoro-phenylazo)-thiophene.

2-Amino-3-cyano-5-(2'-methoxy-5'-sulphonylfluorophenylazo)-thiophene (12.5 parts) was stirred in glacial acetic acid (830 parts) at 15° C. while 50% sulphuric acid (375 parts) was added slowly. On cooling further to 0°–5° C. 40% nitrosyl sulphuric acid (18 parts) was added carefully and the reaction stirred for 2 hours before adding slowly, while maintaining the pH at 3 by the addition of 50% sodium hydroxide solution, to a mixture of N-(2-cyanoethyl) N-acetoxyethylaniline (15 parts) was stirred in ice/water (960 parts), sulphamic acid (10 parts) and saturated sodium acetate solution (50 parts). The product was isolated by filtration, washed with water and pulled dry. The damp solid was then slurried in methanol (100 parts), refiltered then washed with water to yield 4-(3-cyano-5-(2'-methoxy-5'-sulphonylfluorophenylazo)-2-thiophene-azo)N-(2-cyanoethyl)-N-acetoxyethyl aniline (3 parts) which when applied to polyester materials from an aqueous dispersion gave blue shades.

EXAMPLE 15

The procedure for Example 14 was repeated except that in place of 15 parts of N-(2-cyanoethyl)-N-acetoxyethyl aniline; 15 parts of N-butyl-N-(2-cyanoethyl) aniline were used to yield the product 4-(3-cyano-5-(2'-methoxy-5'-sulphonylfluorophenylazo)-2-thiophene-azo)-N-butyl-N-(2-cyanoethyl)aniline (6 parts) which when applied to polyester materials from an aqueous dispersion gave blue shades.

EXAMPLE 16

3-Aminobenzenesulphonylfluoride hydrochloride hydrate (4 parts) was stirred in acetic/propionic acid 86/14 vol/vol (250 parts) at 0°–5° C. While maintaining the temperature below 10° C., 40% nitrosyl sulphuric acid (4.8 parts) was added carefully and stirred for 1.5 hours before adding slowly to 2-amino-3-ethoxycarbonyl-thiophene (4.2 parts) in methanol (625 parts), ice/water (840 parts). The pH was maintained at 3 by the addition of sodium acetate and 50% sodium hydroxide solution. After stirring at 0°–5° C. for a further 2 hours filtration yielded 3.3 parts of 2-amino-3-ethoxycarbonyl-5-(3'-sulphonylfluorophenylazo)thiophene.

2-Amino-3-ethoxycarbonyl-5-(3'-sulphonylfluorophenylazo)thiophene (12.5 parts) was stirred in glacial acetic acid (830 parts) at 15° C. while 50% sulphuric acid (375 parts) was added slowly. On cooling further to 0°–5° C., 40% nitrosyl sulphuric acid (18 parts) was added carefully and the reaction stirred for 2 hours before adding slowly, while maintaining the pH at 3 by the addition of 50% sodium hydroxide solution, to N-ethyl-N-(2-cyanoethyl)-aniline (15 parts) was stirred in ice/water (960 parts), sulphamic acid (10 parts) and saturated sodium acetate solution (50 parts). The product was isolated by filtration, washed with water and pulled dry. The damp solid was then slurried in methanol (100 parts), refiltered then washed with water to yield 4-(3-ethoxycarbonyl-5-(3'-sulphonylfluoro-phenyl-azo)-2-thiophene-azo)-N-ethyl-N-(2-cyanoethyl)-aniline (2.7 parts) which when applied to polyester materials from an aqueous dispersion gave blue shades.

EXAMPLE 17

The procedure for Example 1 was repeated except that in place of 15 parts of N,N-bis-(acetoxyethyl)-aniline; 15 parts of N-ethyl-N-((4-sulphonylfluorophenyl)-propyl)-aniline was used to yield the product 4-(3-cyano-5-(4'-sulphonylfluoro-phenylazo)-2-thiophene-azo)-N-ethyl-N-((4-sulphonylfluorophenyl)-propyl)-aniline (0.25 parts).

When applied to polyester materials from an aqueous dispersion, the dye gave blue shades. $\lambda_{max}$ 649 nm.

EXAMPLE 18

The procedure for Example 6 was repeated except that in place of 15 parts of N,N-diethylaniline; 15 parts of N-ethyl-N-((4-sulphonylfluorophenyl)-ethyl)-aniline was used to yield the product 4-(3-cyano-5-(3'-sulphonylfluorophenylazo)-2-thiophene-azo)-N-ethyl-N-((4-sulphonylfluorophenyl)-ethyl)-aniline (4 parts). When applied to polyester materials from an aqueous dispersion, the dye gave blue shades. $\lambda_{max}$ 629 nm.

EXAMPLE 19

The procedure for Example 14 was repeated except that in place of 15 parts of N-(2-cyanoethyl)-N-acetoxyethylaniline; 15 parts of N-ethyl-N-((4-sulphonylfluorophenyl)-ethyl)-aniline was used to yield the product 4-(3-cyano-5-(2'-methoxy-5'-sulphonylfluorophenyl azo)-2-thiophene-axo)-N-ethyl-N-((4-sulphonylfluorophenyl)-ethyl)-aniline (1.6 parts). When applied to polyester materials from an aqueous dispersion, the dye gave blue shades. $\lambda_{max}$ 627 nm.

EXAMPLE 20

The procedure for Example 16 was repeated except that in place of 4 parts of 3-aminobenzenesulphonyl fluoride hydrochloride hydrate; 4 parts of 4-nitroaniline was used and in place of 15 parts of N-ethyl-N-(2-cyanoethyl)-aniline; 15 parts of N-ethyl-N-((4-sulphonylfluorophenyl)-ethyl)-aniline was used. This yielded 4-(3-ethoxycarbonyl-5-(4'-nitro-phenyl-azo)-2-thiophene-azo)-N-ethyl-N-((4-sulphonylfluorophenyl)-ethyl)-aniline (1.9 parts), which when applied to polyester materials from an aqueous dispersion gave blue colours.

EXAMPLE 21

Sulphanilyl fluoride (4 parts) was stirred in acetic/propionic acid 86/14 vol/vol (250 parts) at 0°–5° C. While maintaining the temperature below 10° C., 40% nitrosyl sulphuric acid (4.8 parts) was added carefully and stirred for 1.5 hours.

The diazo component was then added slowly to 2,5-dimethoxyaniline (4.1 parts) in methanol (625 parts) and ice/water (840 parts). The pH was maintained at 5-6 by the addition of sodium acetate. After stirring at 0°–5° C. for 2 hours the mixture was allowed to warm to room temperature before being filtered to yield 3.8 parts of 2,5-dimethoxy-4-(4'-sulphonylfluorophenyl-azo)-aniline.

2,5-Dimethoxy-4-(4'-sulphonylfluorophenyl-azo)-aniline (8 parts) was stirred in conc. sulphuric acid (750 parts). On cooling to 0°–5° C., 40% nitrosyl sulphuric acid (12 parts) was added carefully and the reaction stirred for 1 hour before being allowed to warm to room temperature.

N-Ethyl-N-(4'-fluorosulphonylbenzyl)-aniline (14 parts) was stirred in ice/water (960 parts), sulphamic acid (10 parts) and methanol (1250 parts). The diazo (8 parts) was then added slowly while maintaining the pH at 5–6 by the addition of sodium acetate and sodium carbonate solution. The oil obtained was the taken up in dichloromethane and purified by column chromatography. Yielded 0.1 parts of the product 4-( 2',5'-Dimethoxy-4-(4"-sulphonylfluorophenyl-azo)-phenylazo)-N-ethyl-N-(4'-fluorosulphonylbenzyl)-aniline. $\lambda_{max}$ 536 nm.

EXAMPLE 22

The procedure for Example 21 was repeated except that in place of 14 parts of N-ethyl-N-(4'-fluorosulphonylbenzyl)- aniline; 14 parts of N,N-dibutyl -m-toluidine was used to yield the product 4-( 2',5'-Dimethoxy-4-(4"-sulphonylfluorophenyl-azo)-phenylazo)-N,N-dibutyl-m- (0.27 parts).

EXAMPLE 23

2-Methyl-4-(4'-phenylazo-phenylazo) -phenol (3.2 parts) was carefully added to stirring chlorosulphonic acid (376 parts). Thionyl chloride (82 parts) was then added and the mixture heated at 90° C. for 28 hours. The reaction mixture was then drowned out into ice/water very carefully and filtered. The solid was washed several times with water until the washings were neutral before drying to yield 5-(4'-(4"-chlorosulphonyl-phenylazo)-phenylazo)-2-hydroxy-3-methyl -benzenesulphonyl chloride (3.1 parts).

5-(4'-(4"-Chlorosulphonyl-phenylazo)-phenylazo)-2-hydroxy-3-methyl-benzenesulphonyl chloride (1.95 parts) was stirred in 1,4-dioxan (117.5 parts) before potassium fluoride (34 parts) dissolved in water (440 parts) was added over 2–3 minutes. After heating at 50°–60° C. for 2 hours the reaction mixture was cooled and filtered. The solid was washed with water and dried to yield 5-(4'-(4"-fluorosulphonyl-phenylazo)-phenylazo)-2-hydroxy-3-methyl-benzenesulphonyl fluoride (1.6 parts).

EXAMPLE 24

The procedure for Example 23 was repeated except that the starting dye was 4-(4'-phenylazo-naphth-1-ylazo)-phenol (5.7 parts) and the treatment with chlorosulphonic acid was carried out at 75° C. The product (2.1 parts) was found to be a mixture of two compounds, 5-(4"-(4'-fluorosulphonyl-phenylazo)-naphth-1-ylazo)-2-hydroxybenzene sulphonyl fluoride and 5-(4"-(4'-fluorosulphonyl-phenylazo)-naphth-1-ylazo)-2-hydroxy-benzene-1,3-disulphonyl fluoride.

EXAMPLE 25

The procedure for Example 23 was repeated except that the starting dye was 1-methyl-3-(4-phenylazo-phenylazo)-1H-quinolin-2-one (2.2 parts) and heating with chlorosulphonic acid was carried out for 2 hours. The product (0.6 parts) was found to be a mixture of 1-methyl-3-(4'-(4"-fluorosulphonyl-phenylazo)-phenylazo)-4-(1H-quinolin-2-onyl)-sulphonyl fluoride and 1-methyl-3- (4-phenylazo-phenylazo) -4- (1H-quinolin-2-onyl)-sulphonyl fluoride.

EXAMPLE 26

The procedure for Example 23 was repeated except that the starting dye was 4-(4'-(4"-nitro-phenylazo)-phenylazo)-phenol (11.5 parts) and that the dye was heated at 75°–80° C. with the chlorosulphonic acid. The product (5.5 parts) was found to be a mixture of two compounds, 2-hydroxy-5-(4'-(4"-nitro-phenylazo)-phenylazo)-benzenesulphonyl fluoride and 2-hydroxy-5-(4'-(4"-nitro-phenylazo)-phenylazo)-benzene-1,3-disulphonyl fluoride.

EXAMPLE 27

The procedure for Example 23 was repeated except that the starting dye was 2-methyl-4-(2',5'-dimethyl-4'-(4"-nitro-phenylazo)-phenylazo)-phenol (3.85 parts) and that the dye was heated for only 3 hours with chlorosulphonic acid. The product of the reactions was found to be 2-hydroxy-3-methyl-5-(2',5'-dimethyl-4'-(4"-nitro-phenylazo)-phenylazo)-benezenesulphonyl fluoride (0.2 parts).

EXAMPLE 28

The procedure for example 23 was repeated except that the starting dye was 2-methyl- (3,3'-dichloro-4'-(4-hydroxy-3-methyl-phenylazo)-biphenyl-4 ylazo)-phenol (3.05 parts) and the dye was heated for only 3 hours. The product (2.95 parts) was found to be a mixture of two compounds, 5-(3,3'-dichloro-4'-(3-fluorosulphonyl-4-hydroxy-5-methyl-phenylazo)-biphenyl-4-ylazo) -2-hydroxy-3-methyl-benezenesulphonyl fluoride and 5-(3,3'-dichloro-4'-(3-methyl-4-hydroxy-phenylazo)-biphenyl-4-ylazo)-2-hydroxy-3-methyl-benezenesulphonyl fluoride.

We claim:

1. A process for coloring a synthetic textile material or fibre blend thereof which comprises applying to the synthetic textile material a disazo compound of Formula (1):

wherein

A is phenyl or phenyl substituted by a group selected from $NO_2$, $SO_2F$,—$C_{1-6}$alkyl and $C_{1-6}$-alkoxy;

D is selected from 1,4-phenylene, 1,4-naphthylene, 4,4'-biphenylene and thien-2,5-ylene each of which is unsubstituted or substituted by a group selected from Cl, CN, $C_{1-6}$-alkyl, $C_{1-6}$-alkoxy and $COOC_{1-6}$-alkyl, and E is phenyl or quinolinyl each of which is unsubstituted or substituted by a group selected from $SO_2F$, $C_{1-6}$-alkyl, $NHCOC_{1-6}$-alkyl and $NR^1R^2$ wherein $R^1$ and $R^2$ are each independently $C_{1-10}$-alkyl or $C_{1-6}$-alkyl substituted by a group selected from CN, $OCOC_{1-6}$-alkyl, $COOC_{1-6}$-alkenyl, phenyl and fluorosulphonylphenyl; provided that the disazo compound of Formula (1) contains at least one —$SO_2F$ group.

2. A process according to claim 1 in which the disazo compound is of Formula (2):

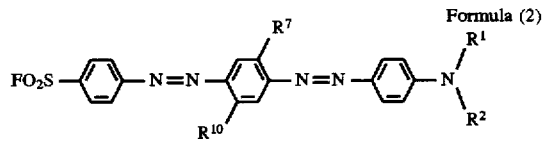

in which:

$R^1$ & $R^2$ each independently is $C_{1-6}$-alkyl or fluorosulphonylphenyl-$C_{1-6}$-alkyl; and $R^7$ & $R^{10}$ each independently is $C_{1-6}$-alkoxy.

3. A process according to claim 1 in which the disazo compound is of Formula (3):

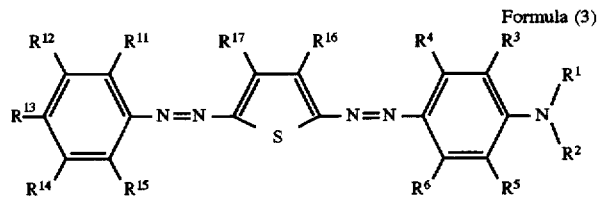

in which:

$R^1$ & $R^2$ each independently is $C_{1-6}$-alkyl or $C_{1-6}$-alkyl substituted by a group selected from CN, $OCOC_{1-6}$-alkyl, $COOC_{1-6}$-alkenyl, phenyl and fluorosulphonylphenyl;

$R^4$ is H, $C_{1-6}$-alkyl or $NHCOC_{1-6}$-alkyl;

$R^{11}$ is H or $C_{1-6}$-alkoxy;

$R^{13}$ is —H, —$SO_2F$ or —$NO_2$;

$R^{14}$ is —H or —$SO_2F$;

$R^{16}$ is —CN or —$COOC_{1-6}$-alkyl; and each of $R^3$, $R^5$, $R^6$, $R^{12}$, $R^{15}$ and $R^{17}$ is H,
provided that the compound of Formula (3) contains at least one —$SO_2F$ group.

4. A process according to claim 1 wherein the disazo compound is applied to the synthetic textile material or fiber blend thereof in the form of an aqueous dispersion.

5. A process for the mass coloration of a plastics material which comprises directly incorporating into the plastics material a disazo compound of Formula (1)

wherein

A is phenyl or phenyl substituted by a group selected from OH, $NO_2$, $SO_2F$, $C_{1-6}$-alkyl and $C_{1-6}$-alkoxy;

D is selected from 1,4-phenylene, 1,4-naphthylene, 4,4'-biphenylene and thien-2,5-ylene each of which is unsubstituted or substituted by a group selected from Cl, CN, $C_{1-6}$-alkyl, $C_{1-6}$-alkoxy and $COOC_{1-6}$-alkyl, and E is phenyl or quinolinyl each of which is unsubstituted or substituted by a group selected from OH, $SO_2F$, $C_{1-6}$-alkyl, $NHCOC_{1-6}$-alkyl and $NR^1R^2$ wherein $R^1$ and $R^2$ are each independently $C_{1-10}$-alkyl or $C_{1-6}$-alkyl substituted by a group selected from CN, $OCOC_{1-6}$-alkyl, $COOC_{1-6}$-alkenyl, phenyl and fluorosulphonylphenyl; provided that the disazo compound of Formula (1) contains at least one —$SO_2F$ group.

6. A process according to claim 1 or claim 5 wherein the disazo compound also contains an ester group.

7. A disazo compound of Formula (1):

wherein

A is phenyl or phenyl substituted by a group selected from OH, $NO_2$, $SO_2F$, $C_{1-6}$-alkyl and $C_{1-6}$-alkoxy;

D is selected from 1,4-phenylene, 1,4-naphthylene, 4,4'-biphenylene and thien-2,5-ylene each of which is unsubstituted or substituted by a group selected from Cl, CN, $C_{1-6}$-alkyl, $C_{1-6}$-alkoxy and $COOC_{1-6}$-alkyl, and E is phenyl or quinolinyl each of which is unsubstituted or substituted by a group selected from OH, $SO_2F$, $C_{1-6}$-alkyl, $NHCOC_{1-6}$-alkyl and $NR^1R^2$ wherein $R^1$ and $R^2$ are each independently $C_{1-10}$alkyl or $C_{1-6}$-alkyl substituted by a group selected from CN, —$OCOC_{1-6}$-alkyl, $COOC_{1-6}$-alkenyl, phenyl and fluorosulphonylphenyl;

provided that the disazo compound of Formula (1) contains at least one —$SO_2F$ group and at least one ester group.

* * * * *